United States Patent
Chethik

(10) Patent No.: US 6,816,112 B1
(45) Date of Patent: Nov. 9, 2004

(54) HYBRID RF/OPTICAL ACQUISITION AND TRACKING SYSTEM AND METHOD

(75) Inventor: Frank Chethik, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/452,617

(22) Filed: May 30, 2003

(51) Int. Cl.[7] .......................... G01S 5/14; H04B 10/00
(52) U.S. Cl. ................. 342/357.14; 342/359; 398/115; 398/117; 398/123
(58) Field of Search ....................... 342/357.11, 357.14, 342/359, 354; 343/725, 720; 398/115–117, 123, 122, 121, 125

(56) References Cited

U.S. PATENT DOCUMENTS

| | | | | |
|---|---|---|---|---|
| 3,052,515 A | * | 9/1962 | Guy .............................. 423/7 |
| 3,242,485 A | * | 3/1966 | Astheimer ................... 342/53 |
| 4,355,313 A | * | 10/1982 | Hubert ........................ 343/725 |
| 4,843,397 A | * | 6/1989 | Galati et al. ................... 342/59 |
| 4,954,837 A | * | 9/1990 | Baird et al. ................. 342/458 |
| 5,268,680 A | * | 12/1993 | Zantos ......................... 342/53 |
| 5,298,909 A | * | 3/1994 | Peters et al. ................. 343/720 |
| 5,672,872 A | * | 9/1997 | Wu et al. .................... 250/330 |
| 6,072,571 A | * | 6/2000 | Houlberg ............... 356/139.04 |
| 6,396,233 B1 | * | 5/2002 | Christison et al. .......... 318/625 |
| 6,445,351 B1 | * | 9/2002 | Baker et al. ................. 343/725 |
| 6,463,366 B2 | * | 10/2002 | Kinashi et al. ............... 701/13 |

* cited by examiner

Primary Examiner—Gregory C. Issing
(74) Attorney, Agent, or Firm—Kenneth W. Float

(57) ABSTRACT

A hybrid optical and millimeter wave beam acquisition and tracking system and method. A host platform includes an INS and a GPS for generating geolocation data, optical and RF receivers, and a common optical/RF aperture. An interface is coupled to the host platform by way of a mechanical gimbal and includes a beamsplitter, an optical gimbal and optical aperture, and an RF aperture. A CPU on the interface includes an optical track error processor for acquiring the optical beam by systematically searching for a focused light spot in a focal plane of the optical receiver, an RF track error processor for outputting gimbal angles of the mechanical gimbal that are derived from the aperture of the RF receiver that are referenced to the inertial navigation system, and a search and track processor that generates an optical gimbal control signal for the optical gimbal and a mechanical gimbal control signal for the mechanical gimbal for tracking the optical and RF beams.

10 Claims, 2 Drawing Sheets

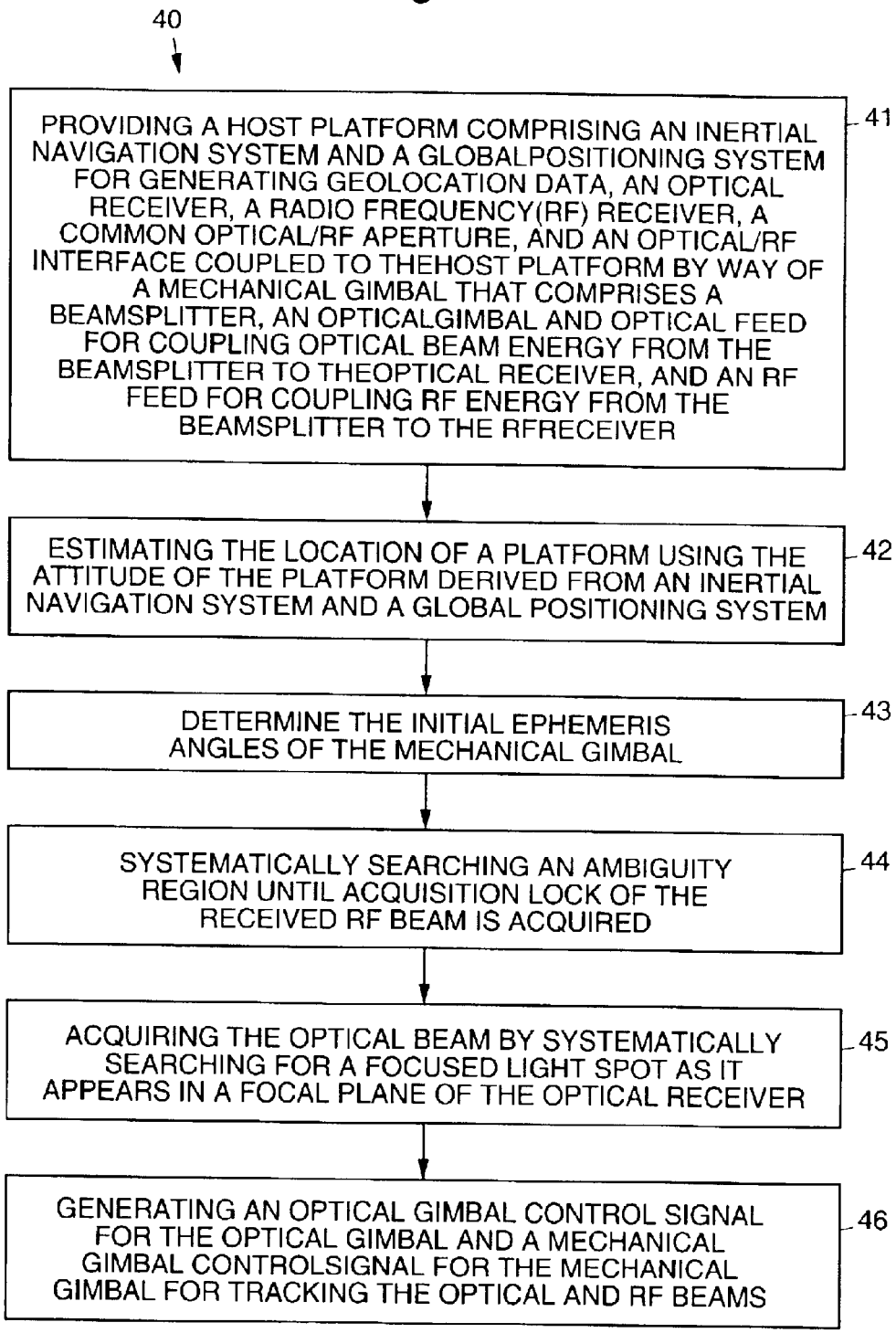

HYBRID RF/OPTICAL ACQUISITION AND TRACKING SYSTEM AND METHOD

BACKGROUND

The present invention relates generally to optical (laser) pointing acquisition and tracking (PAT) systems and methods, and more particularly, to improved acquisition through the use of hybrid RF/optical tracking systems and methods.

Conventional optical pointing acquisition and tracking systems are very slow to acquire PAT on the received signal. Furthermore, optical communication systems typically do not have backup systems that are operative in the case of optical path interruption due to obscuration or excessive beam jitter.

It is an objective of the present invention to provide for improved optical beam pointing, acquisition and tracking by means of hybrid RF/optical pointing acquisition and tracking systems and methods.

SUMMARY OF THE INVENTION

To meet the above and other objectives, the present invention provides for a hybrid optical (laser) and millimeter wave beam acquisition and tracking system for an airborne optical atmospheric or space communications link along with an associated beam acquisition and tracking method. The primary function of the hybrid optical and millimeter wave transmission system is transmission of information over an optical medium. The millimeter wave medium is provided to assist in the pointing, and acquisition of tracking of the optical beam, and secondly, to serve as a backup communications medium in the event that the optical path is interrupted due to obscuration or excessive optical beam jitter.

An exemplary beam acquisition and tracking system comprises a host platform having an inertial navigation system and a global positioning system for generating geolocation data, an optical receiver, a radio frequency (RF) receiver, and a common optical/RF aperture. An optical/RF interface is coupled to the host platform by way of a mechanical gimbal that supports a beamsplitter, an optical gimbal and optical feed for coupling optical beam energy from the beamsplitter to the optical receiver, an RF feed for coupling RF energy from the beamsplitter to the RF receiver, and a central processing unit comprising an optical track error processor for acquiring the optical beam by systematically searching for a focused light spot as it appears in a focal plane of the optical receiver, an RF track error processor for outputting gimbal angles of the mechanical gimbal that are derived from the aperture of the RF receiver and that are referenced to the inertial navigation system, and a search and track processor coupled to the optical track error processor and RF track error processor that generates an optical gimbal control signal for the optical gimbal, and generates a mechanical gimbal control signal for the mechanical gimbal for tracking the optical and RF beams.

An exemplary beam acquisition and tracking method comprises the following steps. A host platform is provided that contains an inertial navigation system and a global positioning system for generating geolocation data, an optical receive r, a radio frequency (RF) receiver, a common optical/RF aperture, and an optical/RF interface coupled to the host platform by way of a mechanical gimbal that comprises a beamsplitter, an optical gimbal and optical feed for coupling optical beam energy from the beamsplitter to the optical receiver, and an RF feed for coupling RF energy from the beamsplitter to the RF receiver.

The ephemeris angles of the mechanical gimbal are initially estimated through knowledge of the host platform's attitude, its geolocation and the geolocation of the cooperating laser transmitter (or cooperating terminal that emits the beam that is to be acquired). These estimates are facilitated by the inertial navigation system and the global positioning system. An optical ambiguity region associated with the RF beam pointing is systematically searched until it is acquired. The focal plane of the optical receiver is systematically searched until the optical beam is acquired. (Fast steering mirrors or other methods are used for search and track of the optical signals). Control signals for the optical gimbal and a mechanical gimbal control system are generated for tracking the optical and RF beams.

The RF and optical elements of the hybrid system share a common aperture on the host platform. It is estimated that the incremental cost of the millimeter wave components are a small fraction of the optical system. The improvement in functionality, reduced optical beam acquisition time and backup for optical path outage, justifies the increased cost/complexity.

The present invention provides for reduced beam acquisition time in an airborne laser communications system. The present invention employs a systematic and exhaustive search of an ambiguity window requiring multiple complex hardware or very long acquisition time. The present invention reduces acquisition time and provides an RF backup carrier during optical outages. The present invention does not require a large radome since the millimeter wave antenna shares a common window (aperture) with the optical aperture.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 is a flow diagram that illustrates an exemplary hybrid acquisition and tracking method in accordance with the principles of the present invention.

DETAILED DESCRIPTION

Figure 1:
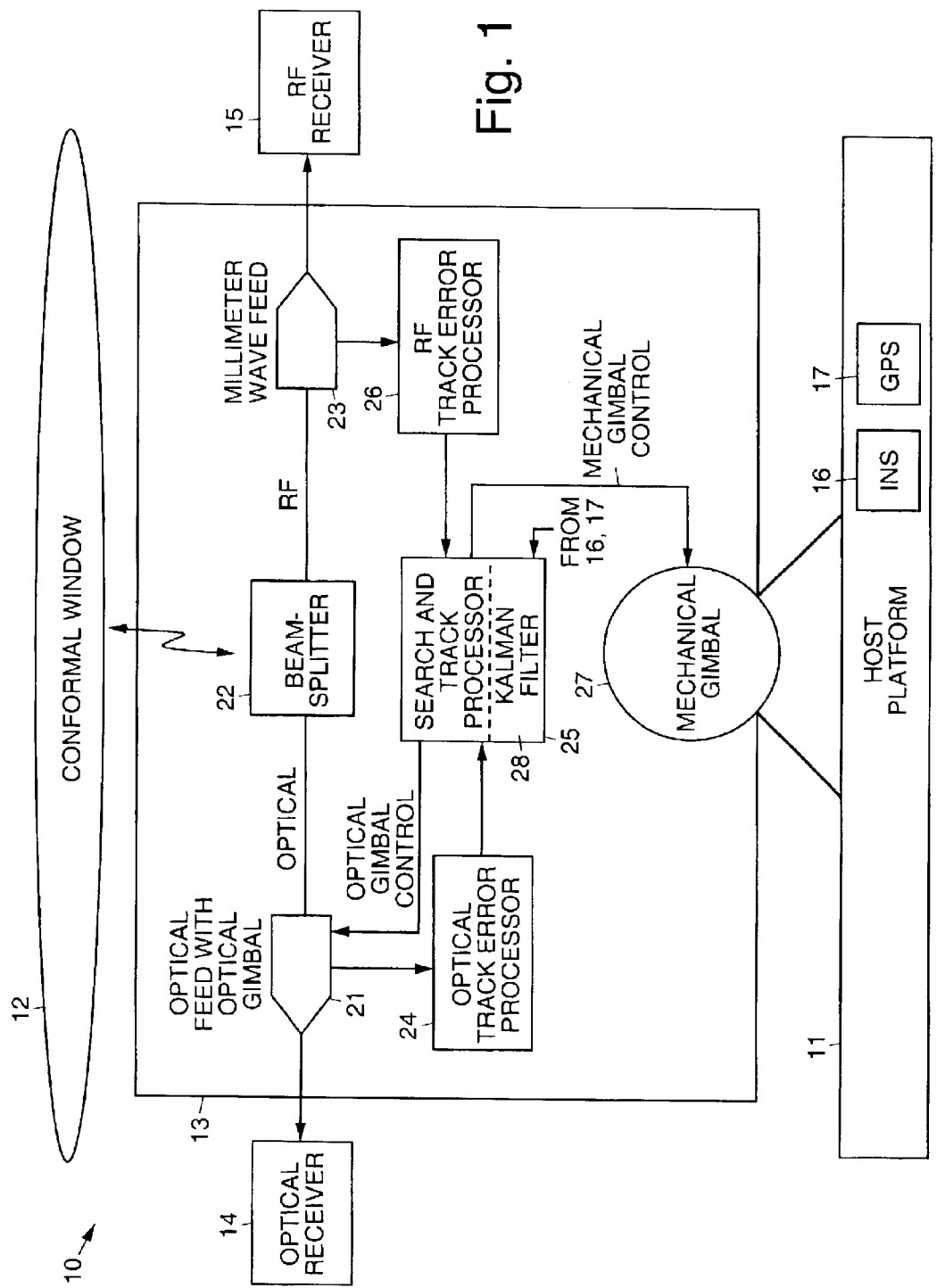
FIG. 1 illustrates an exemplary hybrid acquisition and tracking system in accordance with the principles of the present invention.

Referring to the drawing figures, FIG. 1 illustrates an exemplary hybrid acquisition and tracking system 10 in accordance with the principles of the present invention. The exemplary system 10 is employed on a host platform 11, such as an airborne or space vehicle, for example. The host platform includes an inertial navigation system (INS) 16 and a global positioning system 17, such as a GPS Navstar system 17, for geolocation and estimating ephemeris data for connection to the platform 11.

The system 10 comprises an optical receiver 14 and a radio frequency (RF) receiver 15, such is provided by a millimeter wave receiver 15, for example. The optical receiver 14 and the RF receiver 15 shared a common aperture 12 comprising a conformal window 12 or radome 12. Thus, there is an RF (millimeter wave) aperture and an optical aperture.

The use of the common conformal window 12 or radome 12 for both RF and optical signals allows the system 10 to be more easily accommodated on a large variety of platforms 11. Conforming the window 12 with the geometry of an airborne platform, for example, 11 minimizes turbulence compared with extending a radome into the air stream.

The system 10 comprises a hybrid optical/RF interface 13 that is coupled to the host platform 11 by means of a mechanical gimbal 27. The hybrid optical/RF interface 13 interfaces with the optical receiver 14 and RF receiver 15 by directing signals between them and the target field by way of the common aperture 12.

The hybrid optical/RF interface 13 comprises a beamsplitter 22 that is used to direct optical (laser) beam energy along an optical path and RF (millimeter wave) energy along an RF path. Optical (laser) beam energy directed along the optical path is coupled to the optical receiver 14 by way of an optical gimbal and optical feed 21. RF energy directed along the RF path is coupled to the RF receiver 15 by way of a millimeter wave feed 23 comprising a millimeter wave antenna 23.

The optical gimbal and optical feed 21 is coupled to an optical track error processor 24, which is part of an embedded central processing unit (CPU). The millimeter wave feed 23 is coupled to an RF track error processor 25, which is part of the embedded CPU. Outputs of the optical track error processor 24 and RF track error processor 25 are coupled to a search and track processor 25, which is also part of the embedded CPU. The search and track processor 25 receives inputs from the inertial navigation system 16 and the global positioning system 17. The search and track processor 25 comprises a Kalman filter 28 that is used to estimate ephemeris data.

The search and track processor 25 outputs an optical gimbal control signal that is coupled to the optical gimbal and optical feed 21. The search and track processor 25 outputs a mechanical gimbal control signal that is coupled to the mechanical gimbal 27.

The methodology used in the hybrid acquisition and tracking system 10 to search for and track the optical and millimeter wave beams is discussed below. FIG. 2 is a flow diagram that illustrates an exemplary hybrid acquisition and tracking method 40 in accordance with the principles of the present invention that is implemented in the above-described system 10.

A system 10 and host platform 11 are provided 41 that are configured as described above. The hybrid acquisition and tracking method 40 processes gimbal angles (of the mechanical gimbal 27) that are derived from the aperture of the millimeter wave receiver 15. The gimbal angles, referenced to the inertial navigation system (INS) 16 of the host platform 11, are passed to the search and track processor 25 and a beam (transmitted by a cooperating transmitter or terminal) is acquired through a systematic search of the boresight ambiguity of the millimeter wave antenna 23.

Millimeter wave (RF) beam acquisition is initiated from an estimate 42 of the location of the platform 11 and knowledge of the attitude (heading, pitch and roll angles) of the host platform 11 derived from the inertial navigation system (INS) 16. This, together with location data of the cooperating transmitter or terminal is used to determine 43 the initial mechanical gimbal ephemeris angles. A systematic search 44 (conical or raster scan) of the ambiguity region is initiated and conducted until acquisition lock of the received millimeter wave (RF) beam is acquired. Transients are permitted to settle to steady state and tracking of the millimeter wave (RF) beam is maintained.

The receiver apertures of the millimeter wave receiver 15 and optical receiver 14 must be aligned so that they are coaxial within a few beamwidths of the optical beam. This takes great precision for this alignment.

It is assumed for the purposes of this exemplary description that the frequency of the optical (laser) beam is four orders of magnitude higher than that of the millimeter wave carrier of the millimeter wave beam. Thus, for the same (antenna or lens) aperture diameter, the optical beamwidth is $\frac{1}{10,000}$th the beamwidth of the millimeter wave carrier.

The optical beam is acquired after the acquisition of tracking steady state of the millimeter wave receiver 15. The optical beam is acquired through a systematic search 45 for the focused light (laser) spot as it appears in a focal plane of the optical receiver 14. Given that the millimeter wave tracking system may resolve the angle of arrival to within, say, $\frac{1}{100}$th of the millimeter wave aperture's beamwidth, the (circular) uncertainty of the coaxial optical (laser) beam in the focal plane is a diameter of approximately 100 beamwidths, or an uncertainty of about 7500 optical beam positions.

These may be systematically searched at a rate of, say 1 microsecond per location, for example. The entire uncertainty window may be exhaustively searched in a few milliseconds, and the beam may thus be rapidly acquired. It is assumed that the jitter of the platform 11 is very small compared to the millimeter wave beamwidth over a 10 millisecond interval so that the true beam position is not missed during acquisition. When the jitter bandwidth of the platform 11 is of significant amplitude in 10 milliseconds, for example, several searches may be required, extending the acquisition interval to several tens of milliseconds.

Once the RF and optical beams are acquired, an optical gimbal control signal for the optical gimbal and a mechanical gimbal control signal for the mechanical gimbal are generated 46 that track the RF and optical beams.

Thus, it can be seen that, in the hybrid acquisition and tracking system 10, tracking is facilitated by feedback control mechanisms that are traditional in optical trackers but in addition includes processing of factored errors and gimbal angles from the millimeter wave antenna tracking system that are used to generate the mechanical gimbal control signals.

Thus, improved hybrid RF/optical acquisition and tracking systems and methods have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. An optical beam acquisition and tracking system comprising:

a host platform comprising an inertial navigation system and a global positioning system for generating geolocation data;

an optical receiver;

a radio frequency (RF) receiver;

a common aperture for use by the optical receiver and RF receiver;

an optical/RF interface coupled to the host platform by way of a mechanical gimbal that comprises:

a beamsplitter for directing optical beam energy along an optical path to the optical receiver and RF energy along an RF path to the RF receiver;

an optical gimbal and optical feed for coupling optical beam energy from the beamsplitter to the optical receiver;

an RF feed for coupling RF energy from the beamsplitter to the RF receiver; and a central processing unit comprising an optical track error processor for acquiring the optical beam by systematically searching for a focused light spot as it appears in a focal plane of the optical receiver, an RF track error processor for outputting gimbal angles of the mechanical gimbal that are derived from the aperture of the RF receiver and that are referenced to the inertial navigation system, and a search and track processor coupled to the optical track error processor and RF track error processor that generates an optical gimbal control signal for the optical gimbal, and generates a mechanical gimbal control signal for the mechanical gimbal for tracking the optical and RF beams.

2. The system recited in claim 1 wherein the radio frequency receiver comprises a millimeter wave receiver.

3. The system recited in claim 1 wherein the common aperture comprises a conformal window on the platform.

4. The system recited in claim 1 wherein the RF track error processor systematically searches for the received RF beam.

5. The system recited in claim 1 wherein the RF track error processor systematically searches for the received RF beam by performing a scan of an ambiguity region associated with the RF beam.

6. An optical beam acquisition and tracking method comprising the steps of:

providing a host platform that comprises an inertial navigation system and a global positioning system for generating geolocation data, an optical receiver, a radio frequency (RF) receiver, a common optical/RF aperture, and an optical/RF interface coupled to the host platform by way of a mechanical gimbal that comprises a beamsplitter, an optical gimbal and optical feed for coupling optical beam energy from the beamsplitter to the optical receiver, and an RF feed for coupling RF energy from the beamsplitter to the RF receiver;

estimating the location of the platform using the attitude of the host platform derived from the inertial navigation system and the global positioning system;

determining initial ephemeris angles of the mechanical gimbal;

systematically searching an ambiguity region associated with the RF beam until it is acquired;

systematically searching for a focused light spot as it appears in a focal plane of the optical receiver until the optical beam is acquired; and generating an optical gimbal control signal for the optical gimbal and a mechanical gimbal control signal for the mechanical gimbal for tracking the optical and RF beams.

7. The method recited in claim 6 wherein the step of systematic searching for the received optical beam comprises performing a scan of an ambiguity region associated with the RF beam.

8. The method recited in claim 6 wherein the step of systematic searching for the received optical beam comprises performing a scan of an ambiguity region associated with the RF beam.

9. The method recited in claim 6 wherein the radio frequency receiver comprises a millimeter wave receiver.

10. The method recited in claim 6 wherein the common aperture comprises a conformal window on the platform.

* * * * *